US008589910B2

(12) United States Patent
Zubas et al.

(10) Patent No.: US 8,589,910 B2
(45) Date of Patent: Nov. 19, 2013

(54) COORDINATING FIRMWARE OVER-THE-AIR UPDATES FOR MOBILE DEVICES UTILIZING PRESENCE INFORMATION

(75) Inventors: Michael Zubas, Marietta, GA (US); John Lewis, Lawrenceville, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 44 days.

(21) Appl. No.: 13/286,517

(22) Filed: Nov. 1, 2011

(65) Prior Publication Data
US 2013/0111461 A1 May 2, 2013

(51) Int. Cl.
*G06F 9/44* (2006.01)
(52) U.S. Cl.
USPC ............ 717/173; 717/172; 717/177; 717/178
(58) Field of Classification Search
USPC .................................. 717/173, 172, 177, 178
See application file for complete search history.

(56) References Cited

U.S. PATENT DOCUMENTS

| | | | |
|---|---|---|---|
| 7,210,010 B2 * | 4/2007 | Ogle .............................. | 711/162 |
| 7,480,907 B1 * | 1/2009 | Marolia et al. ................ | 717/174 |
| 7,974,613 B1 | 7/2011 | Shanker et al. | |
| 8,180,319 B2 * | 5/2012 | Nalley et al. ............... | 455/404.2 |
| 8,200,886 B2 * | 6/2012 | Ogle ............................. | 711/103 |
| 8,208,892 B2 * | 6/2012 | Nalley et al. ............... | 455/404.1 |
| 2005/0039178 A1 * | 2/2005 | Marolia et al. ................ | 717/168 |
| 2006/0039564 A1 * | 2/2006 | Rao ................................ | 380/270 |
| 2006/0106806 A1 * | 5/2006 | Sperling et al. ................. | 707/10 |
| 2007/0169073 A1 * | 7/2007 | O'Neill et al. ................ | 717/168 |
| 2007/0294385 A1 | 12/2007 | Kapadekar et al. | |
| 2008/0064393 A1 | 3/2008 | Oommen et al. | |
| 2009/0044185 A1 * | 2/2009 | Krivopaltsev ................. | 717/173 |
| 2009/0318124 A1 * | 12/2009 | Haughn ........................ | 455/418 |
| 2010/0135201 A1 * | 6/2010 | Lewis et al. ................... | 370/328 |
| 2011/0200052 A1 | 8/2011 | Mungo et al. | |

* cited by examiner

*Primary Examiner* — Phillip H Nguyen
(74) *Attorney, Agent, or Firm* — Hartman & Citrin LLC

(57) ABSTRACT

A mobile device management ("MDM") server coordinates firmware over-the-air ("FOTA") updates for mobile devices utilizing presence information. In accordance with some the concepts and technologies disclosed herein, a MDM server utilizes presence information for a subscriber obtained from a presence server to determine when it is appropriate to initiate a MDM session with the subscriber's mobile device over which to deliver a FOTA package to the subscriber's mobile device.

14 Claims, 11 Drawing Sheets

COORDINATING FIRMWARE OVER-THE-AIR UPDATES FOR MOBILE DEVICES UTILIZING PRESENCE INFORMATION

BACKGROUND

Mobile device management ("MDM") is a set of technologies, protocols, and standards used for the remote management of mobile devices operating in a mobile telecommunications network. MDM provides various services for a mobile telecommunications service provider. One such service, called firmware over-the-air ("FOTA"), allows a mobile telecommunication service provider to send firmware updates to remote mobile devices. The use of MDM to facilitate FOTA updates has greatly improved the delivery of firmware updates to mobile devices operating in a mobile communications service provider's network.

Prior to FOTA, firmware updates required a user to visit a service center to have their mobile device updated with the latest firmware, or to connect their mobile device to a computer through a universal serial bus ("USB") or other connection to update their device with the latest firmware. These methods are inconvenient for the user and rely heavily on users to seek out the firmware update. Some solutions exist to notify the user, via email, short message service ("SMS") message, or other message, to connect their mobile device to their computer to receive the firmware update. These notifications are often ignored because, for many, updating their firmware is a difficult, time-consuming process.

Firmware updates often provide new features, while others are aimed at fixing bugs, improving various performance aspects of the mobile device, or even enabling functionality that is supported by the hardware of the mobile device, but has not yet been enabled. The latter is particularly relevant to devices that ship with hardware that is compatible with a next generation wireless network, but does not include the proper firmware to enable that hardware.

FOTA allows users to download firmware over-the-air directly to their mobile device. The mobile telecommunication service provider delivering the firmware does not know if the user associated with a particular destination mobile device is available to download and install the firmware. As such, firmware updates can be denied by a user. In some implementations, a user may deny a firmware update a predetermined number of times, after which the firmware update is forced. This may inconvenience the user by repeatedly asking the user to download the firmware, particularly if they need to use their mobile device at the time the firmware update is forced.

It is with respect to these and other considerations that the disclosure made herein is presented.

SUMMARY

Concepts and technologies are described herein for coordinating firmware over-the-air ("FOTA") updates for mobile devices utilizing presence information. In accordance with some of the concepts and technologies disclosed herein, a mobile device management ("MDM") server utilizes presence information for a subscriber obtained from a presence server to determine when it is appropriate to initiate a MDM session with the subscriber's mobile device over which to deliver a FOTA package to the subscriber's mobile device.

According to one aspect disclosed herein, a method for performing a FOTA update procedure utilizing presence information comprises receiving a presence status associated with a subscriber from a presence server computer, and determining based upon the presence status whether to initiate a mobile device management session during which to deliver a firmware over-the-air update to a mobile device associated with the subscriber. The method further includes initiating a mobile device management session, and delivering the firmware over-the-air update to the mobile device over the mobile device management session, if the mobile device management server computer determines based upon the presence status that a mobile device management session is to be initiated. The method further includes postponing delivery of the firmware over-the-air update to the mobile device until a new presence status is received at the mobile device management server computer that indicates the mobile device is available to receive the firmware over-the-air update, if the mobile device management server computer determines based upon the presence status that a mobile device management session is not to be initiated.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
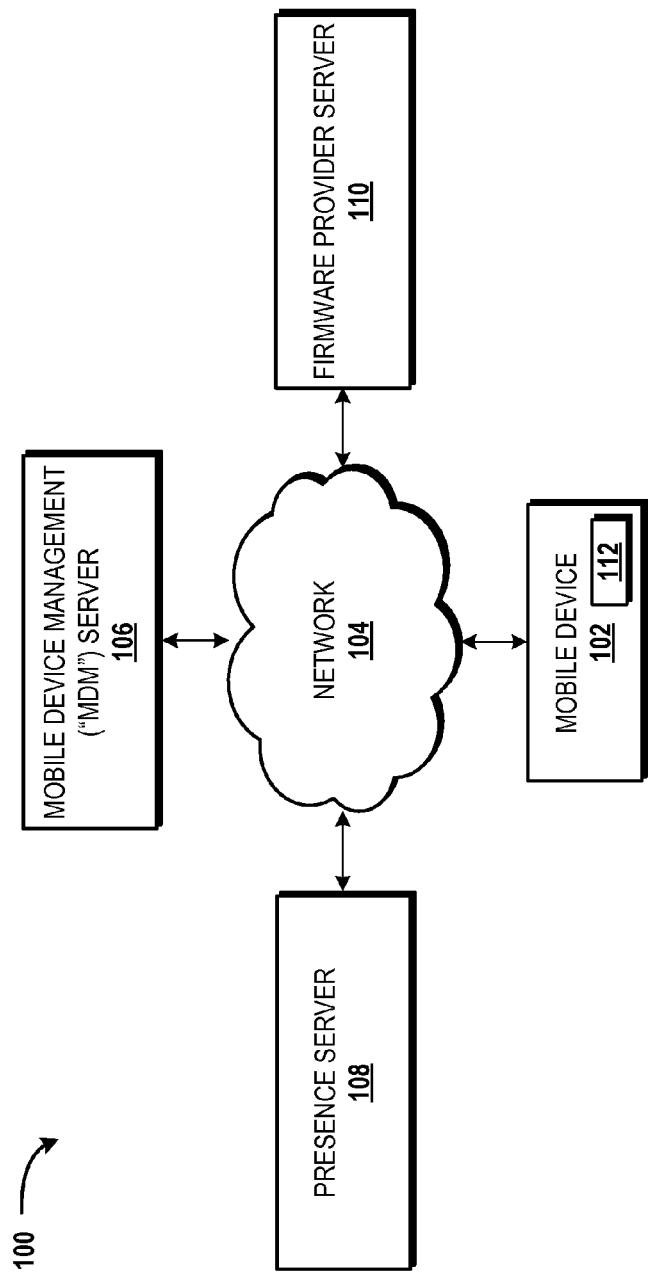
FIG. 1 is a block diagram illustrating aspects of an exemplary operating environment for various concepts disclosed herein.

The following detailed description is directed to concepts and technologies for coordinating firmware over-the-air ("FOTA") updates for mobile devices utilizing presence information. In accordance with some of the concepts and technologies disclosed herein, a mobile device management ("MDM") server utilizes presence information for a subscriber obtained from a presence server to determine when it is appropriate to initiate a MDM session with the subscriber's mobile device over which to deliver a FOTA package to the subscriber's mobile device.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, mobile devices, wireless devices, multiprocessor systems, microprocessor-based or programmable consumer electronics, minicomputers, mainframe computers, routers, switches, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for coordinating FOTA updates for mobile devices utilizing presence information will be presented.

Referring now to FIG. 1, aspects of an exemplary operating environment 100 for various concepts are disclosed herein. The operating environment 100 shown in FIG. 1 includes a mobile device 102 operating on or in communication with a network 104 for receiving a FOTA update from a MDM server 106, providing a presence status to a presence server 108, and performing other operations disclosed herein. The MDM server 106 is configured to receive firmware updates from a firmware provider server 110 and to communicate with the presence server 108 to determine when a presence status received by the presence server 108 from the mobile device 102 indicates the mobile device 102 is available to receive a FOTA update. The presence server 108 is configured to receive, store, and update presence statuses associated with a user of the mobile device 102, and to communicate with the MDM server 106 to provide presence statuses, as will be described in greater detail below. The firmware provider server 110 is configured to send firmware updates to the MDM server 106 for distribution to the mobile device 102. In some embodiments, two or more of the MDM server 106, the presence server 108, and/or the firmware provider server 110 are combined as a single system.

It should be understood that the operating environment 100 and the various components thereof have been greatly simplified for purposes of discussion. In particular, the mobile device 102, the MDM server 106, the presence server 108, and the firmware provider server 110 are all illustrated as being in direct communication with the network 104. Communication links between the individual servers are not illustrated. It should be understood, however, that such communication links are contemplated. It also should be understood that the network 104 is illustrated and described primarily as an access network through which the mobile device 102 downloads firmware updates from the MDM server 106, provides presence statuses to the presence server 108, performs other operations disclosed herein, and performs voice and/or data communication operations. As such, the network 104 may communicate with one or more networks including, but not limited to, a circuit-switched core network of a mobile telecommunications network, a packet-switched core network of a mobile telecommunications network, the Internet, an intranet, an IP multimedia subsystem ("IMS") network, any combination thereof, and the like. Moreover, the MDM server 106, the presence server 108, and the firmware provider server 110 may be in communication with or operate on one or more of these additional networks, or may be in communication with or operate on some other network.

The mobile device 102 is configured to facilitate mobile telecommunications and may further include functionality to facilitate mobile computing. In some embodiments, the mobile device 102 is a mobile telephone, a smart phone, a tablet device, a slate device, a portable video game device, a laptop, a notebook, an ultra-portable, a netbook, or any other mobile, networked computing device that includes a firmware 112 that can be updated or replaced via a FOTA procedure. In particular, the mobile device 102 includes a memory portion, such as a read-only memory ("ROM"), which is configured to store the firmware 112, receive updates to the firmware 112 and rewrite at least a portion of its memory capacity with the firmware updates, and/or receive new firmware and replace the firmware 112 with the new firmware. Firmware as described herein refers to software that is tied to the hardware of the mobile device 102. In some embodiments, the firmware 112 includes an operating system or a portion thereof, such as an operating system kernel. The firmware 112, however, may include any software functionality that, when executed by a processor of the mobile device 102, causes the mobile device 102 to perform one or more operations.

The mobile device 102 is further configured to receive a FOTA package from the MDM server 106 and install the FOTA package. In some embodiments, the FOTA package includes instructions that are to be presented to the user of the mobile device 102 on how to proceed with installing the firmware update. For example, the FOTA package may include instructions that are to be presented on a display of the mobile device 102 and/or via a speaker of the mobile device 102 to inform the user of the mobile device 102 that a firmware update and/or a new firmware is available in the FOTA package, and to prompt the user to accept or deny the firmware update or new firmware. In some embodiments, the FOTA includes a new firmware, an update for a firmware that is currently loaded on the mobile device 102, or both. In some embodiments, a new firmware and an update to an existing firmware are provided as selectable options, the selection of one of which installs the respective new firmware or firmware update. In some embodiments, multiple FOTA packages are delivered to the mobile device 102. In some embodiments, multiple FOTA packages each include one or more firmware or firmware updates that are intended to be installed in a pre-defined order, which may be provided as instructions to the user or implemented in software or firmware to install the firmware updates according to the pre-defined order. In some embodiments, the FOTA package is installed automatically. In some embodiments, the user is provided an option to decline the FOTA package to postpone downloading and installing the FOTA package to a later date. In these embodiments, a limit can be imposed on the number of times a user can decline a FOTA package.

For purposes of explanation, a firmware update is used herein and in the claims to described either an update to an existing firmware, in the form of some patch code or other update code, or a full firmware version that is intended to replace, in its entirety, an existing firmware on the mobile device 102.

The network 104 provides data access to the mobile device 102 over which the mobile device 102 can exchange data including, but not limited to, data associated with a FOTA update procedure utilizing presence information as described in greater detail herein. The network 104, in some embodiments, is a wireless wide area network ("WWAN"), such as a mobile telecommunications network utilizing one or more mobile telecommunications technologies to provide voice and/or data services to the mobile device 102 via a WWAN component (not shown) of the mobile device 102. The mobile telecommunications technologies include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the network 104 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 104 may be configured to provide voice and/or data communications with any combination of the above technologies. The network 104 may be configured to or adapted to provide voice and/or data communications in accordance with future generation technologies.

In some embodiments, the network 104 is a wireless local area network ("WLAN") operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some embodiments, the WLAN is implemented utilizing one or more wireless WI-FI access points. In some embodiments, one or more of the wireless WI-FI access points are another computing device with connectivity to a WWAN that are functioning as a WI-FI hotspot. Connections to the network 104 embodied as a WLAN may be secured via various encryption technologies including, but not limited to, WI-FI Protected Access ("WPA"), WPA2, Wired Equivalent Privacy ("WEP"), and the like. In these embodiments, the mobile device 102 may receive a FOTA download notification via one network, such as a mobile telecommunications network, that includes a request for the user to connect to the network 104 to receive the download.

The MDM server 106 is configured to communicate with the firmware service provider server 110 to receive FOTA packages and to deliver the FOTA packages to mobile devices, such as the mobile device 102, utilizing presence information obtained from the presence server 108. Other operations performed by the MDM server 106 will be described in greater detail herein, particularly with reference to FIG. 2A-2C.

In some embodiments, the MDM server 106 is a modified Open Mobile Alliance ("OMA") device management server configured to operate in accordance with a modified protocol to utilize a presence status associated with the mobile device 102 to determine when to initiate an MDM session over which the MDM server 106 delivers a FOTA package to the mobile device 102. In some embodiments, a MDM system includes one or more MDM servers as part of a distributed computing system in which each of the MDM servers is configured to perform one or more of the operations described herein as being performed by the MDM server 106.

The presence server 108 is configured to maintain presence information for subscribers within a mobile telecommunications network. The presence server is configured to receive presence information from the mobile device 102 and the MDM server 106. The presence server is configured to reconcile conflicting presence information received from the mobile device 102 and the MDM server 106, as will be described in greater detail below with reference to FIG. 5. Other operations performed by the presence server 108 are described in greater detail below with reference to FIGS. 3A-3B. In some embodiments, a presence system includes one or more presence servers as part of a distributed computing system in which each of the presence servers is configured to perform one or more of the operations described herein as being performed by the presence server 108.

The term presence as used herein refers to the availability, activity level, or operating state of a mobile device and/or a user associated therewith. The ability for users to monitor each other's presence is a feature offered in connection with some messaging applications, such as instant messaging application, social networking chat applications, and the like. For example, some messaging applications have a buddy list or contact list feature that displays a contact list and a presence status for each contact in the list. The presence status indicates a user's availability and/or current activity so that others can determine whether to send a message to a particular contact. A presence status can include, but is not limited to, available, unavailable, do not disturb, idle, busy, offline or a custom status.

The firmware provider server 110 is configured to provide firmware updates to the MDM server 106 for delivery to the mobile device 102. In some embodiments, the firmware provider server 110 is an original equipment manufacturer ("OEM") server that is configured to store firmware for one or more mobile devices manufactured by the OEM. In some embodiments, the firmware provider server 110 is a firmware developer server that is configured to store firmware for one or more mobile devices which may or may not utilize the same operating system. In some embodiments, a firmware provider system includes one or more firmware provider servers as part of a distributed computing system in which each of the firmware provider servers is configured to perform one or more of the operations described herein as being performed by the firmware provider server 110.

Figure 2A:
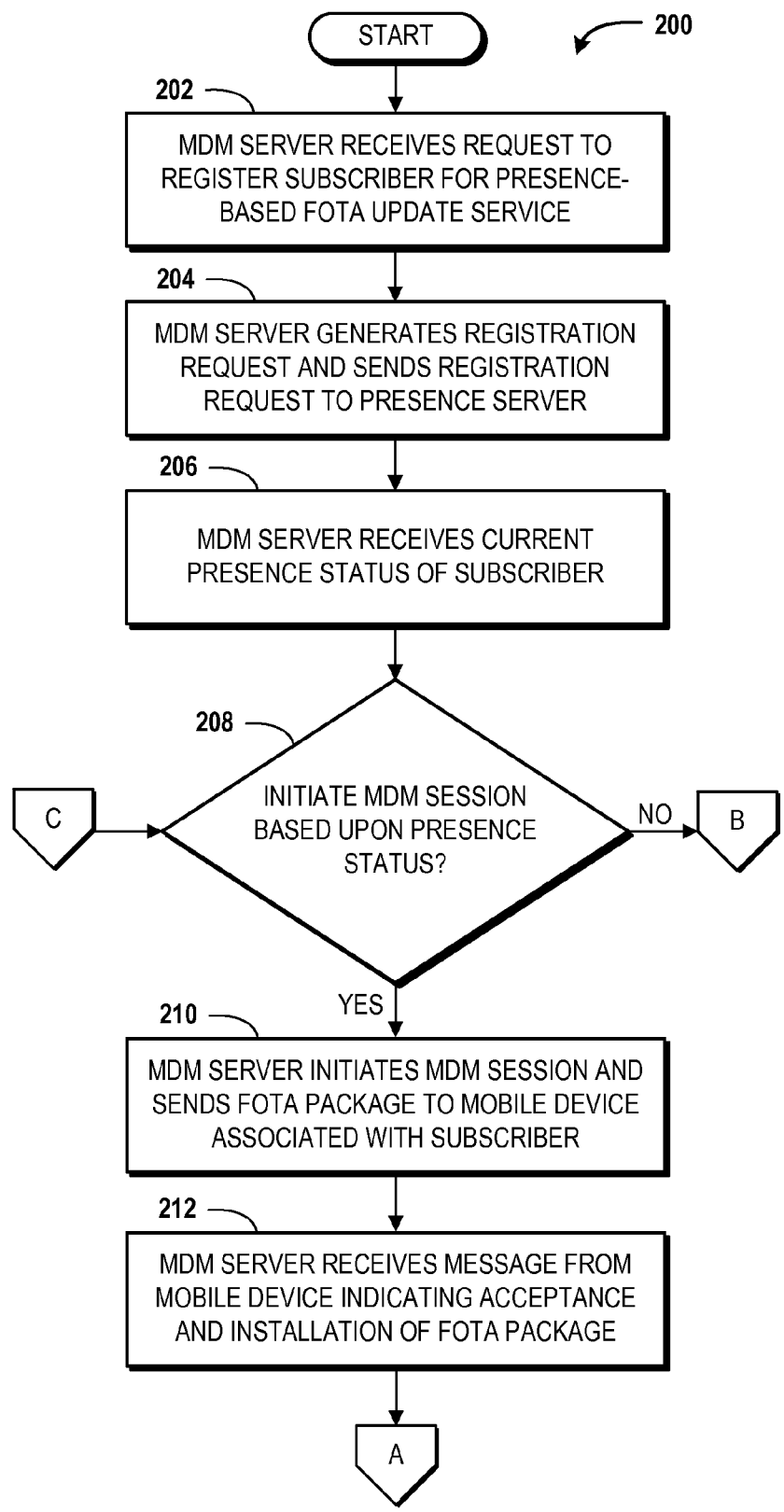
FIGS. 2A-2C are flow diagrams illustrating aspects of a method for performing a firmware over-the-air ("FOTA") update procedure utilizing presence information from the perspective of a mobile device management ("MDM") server, according to an exemplary embodiment.
Figure 2B:
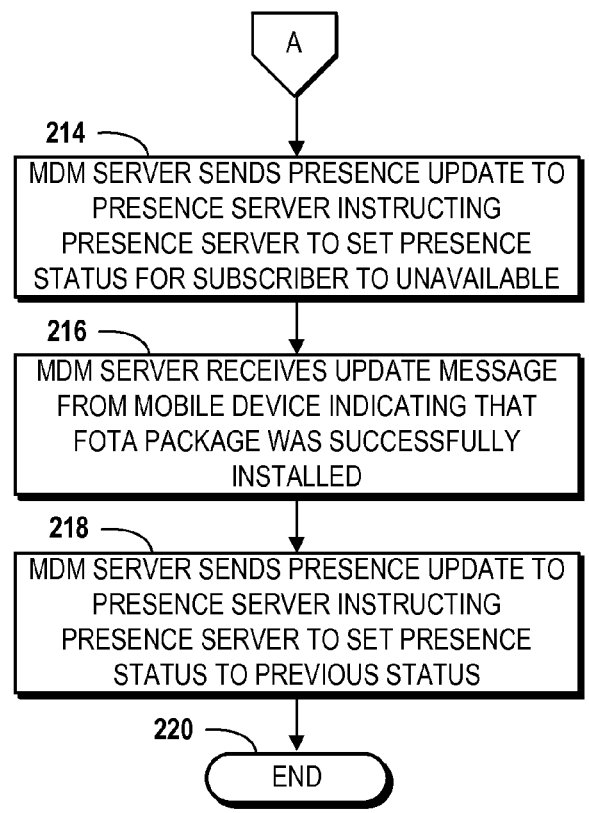
Figure 2C:
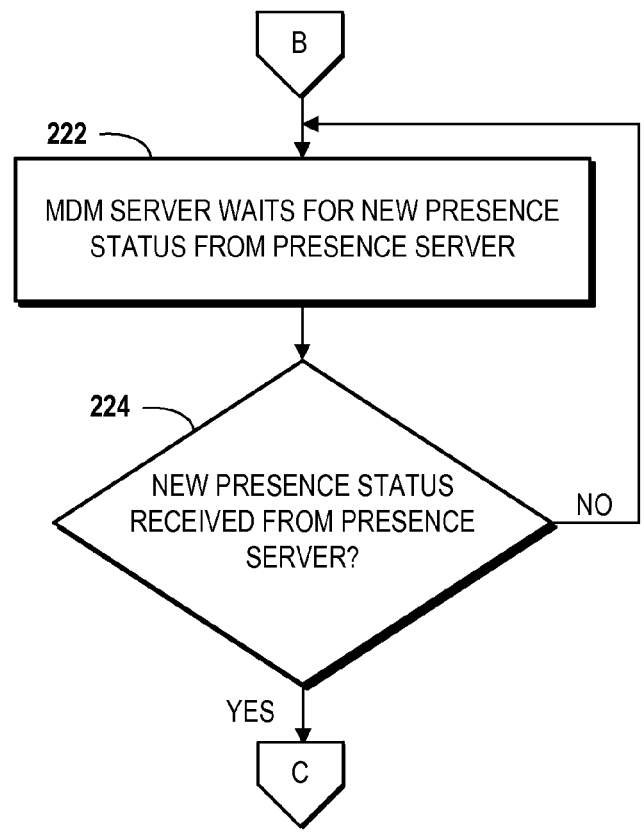

Turning now to FIGS. 2A-2C, flow diagrams illustrating a method 200 for performing a FOTA update procedure utilizing presence information will be described from the perspective of the MDM server 106, according to an exemplary embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in its entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof Turning now to FIG. 2A, the method 200 begins and proceeds to operation 202, wherein the MDM server 106 receives a request to register a subscriber for a presence-based FOTA update service. In some embodiments, the request is received in response to the activation of the mobile device 102. For example, the subscriber may be a new subscriber or an existing subscriber that purchases the mobile device 102 and activates the mobile device 102 through an activation procedure. The activation procedure may be an OTA activation procedure or a tethered activation procedure that requires the mobile device 102 to be in communication with a computer system, such as a personal computer, to activate the mobile device 102. Other activation procedures are contemplated. In some embodiments, the activation procedure prompts the user to opt-in or opt-out of the presence-based FOTA update service. In some embodiments, all or a subset of subscribers are automatically registered for the presence-based FOTA update service at the discretion of a mobile telecommunications service provider.

The request, in some embodiments, is a request initiated after the mobile device 102 has been activated. This type of request may be initiated by the subscriber or by the mobile telecommunications service provider. In some embodiments, the subscriber is provided an option to register for the presence-based FOTA update service via a web interface, such as displayed on a website of the mobile telecommunications service provider. This web interface, in some embodiments, is part of an account management interface, access to which requires authentication via one or more authentication credentials. In some embodiments, a similar option is provided directly from the mobile device 102 through a user interface presented on a display of the mobile device 102. The mobile telecommunications service provider may desire to initiate the request to register one or more subscribers for the presence-based FOTA update service for various reasons, such as the deployment of the presence-based FOTA update service for all or a portion of its subscribers. The MDM server 106 may receive the request to register the subscriber for the presence-based FOTA service for other reasons.

In addition to registering a subscriber for the presence-based FOTA update service, the presence-based FOTA update service may or may not require a subscription. In implementations that require a subscription, at operation 202, the MDM server 106 may additionally receive a separate subscription request. The request to register the subscriber may alternatively include the subscription request. Subscription models for the presence-based FOTA update service may be included with a voice and/or data plan offered by a mobile telecommunications service provider or may be offered as an add-on service. Subscription to the presence-based FOTA update service may be provided for free or for a fee. Subscription to the presence-based FOTA update service may also be incentivized by offering discounts, free mobile device, free mobile device accessories, by some other incentive, or some combination of incentives. In some embodiments, subscription to the presence-based FOTA update service is offered on a month-to-month basis, on a lifetime basis, on a yearly basis, on a bi-yearly basis, on a quarterly basis, or on some other time basis. Subscriptions and other billing related operations are performed by a billing system (not shown).

From operation 202, the method 200 proceeds to operation 204, wherein the MDM server 106 generates a registration request and sends the registration request to the presence server 108. The registration request includes a subscriber identifier, such as a telephone number, international mobile subscriber identity ("IMSI"), or temporary IMSI ("T-IMSI"). The registration request instructs the presence server 108 to send a current presence status of the subscriber identified by the subscriber identifier to the MDM server 106, and to send any updated presence status received thereafter for the subscriber to the MDM server 106. In some embodiments, the registration request includes a time period that specifies when the presence server 108 should send presence status updates to the MDM server 106.

From operation 204, the method 200 proceeds to operation 206, wherein the MDM server 106 receives a current presence status of the subscriber. From operation 206, the method 200 proceeds to operation 208, wherein the MDM server 106 determines whether a MDM session should be initiated to deliver a FOTA package to the mobile device 102 based upon the presence status. In some embodiments, the MDM server 106 determines if the presence status is set to idle and, based upon this determination, determines that a MDM session should be initiated. If the MDM server 106 determines that a MDM session should be initiated, the method 200 proceeds to operation 210, wherein the MDM server 106 initiates a MDM session and sends the FOTA package to the mobile device 102. From operation 210, the method 200 proceeds to operation 212, wherein the MDM server 106 receives a message from the mobile device 102 indicating acceptance of the FOTA package and that the FOTA package is being installed.

It is contemplated that the subscriber may be provided an option to deny the FOTA package and, as a result, the mobile device 102 may send a message indicating the denial of the FOTA package to the MDM server 106. In these instances, the delivery of the FOTA package to the mobile device 102 is repeated one or more times. In some embodiments, the subscriber is not provided the opportunity to accept or deny the FOTA package. In other embodiments, the subscriber is permitted to deny the FOTA package a predetermined number of times, after which the delivery of the FOTA package to the mobile device 102 is forced.

From operation 212, the method 200 proceeds to operation 214, shown in FIG. 2B. At operation 214, the MDM server 106 sends a presence update to the presence server 108 instructing the presence server 108 to set the presence status for the subscriber to unavailable. This ensures that an outside party will not attempt to contact the subscriber via the mobile device 102 and provide an opportunity for the MDM server 106 to deliver the FOTA package to the mobile device 102. From operation 214, the method 200 proceeds to operation 216, wherein the MDM server 106 receives an update message from the mobile device 102 indicating that the FOTA package was successfully installed. In response to receiving the update message, at operation 218, the MDM server 106 sends a presence update to the presence server 108. The presence update instructs the presence server 108 to set the presence status for the subscriber to the presence status as set before the MDM server 106 instructed the presence server 108 to set the presence status to unavailable at operation 214. From operation 218, the method 200 proceeds to operation 220. The method 200 ends at operation 220.

Turning back to FIG. 2A, if the MDM server 106 determines, at operation 208, that a MDM session should not be initiated, the method 200 proceeds to FIG. 2C and, particularly, to operation 222. At operation 222, the MDM server 106 waits for a new presence status from the presence server 108. From operation 222, the method 200 proceeds to operation 224, wherein the MDM server 200 determines if a new presence status has been received from the presence server 108. If a new presence status has not been received, the method 200 loops back to operation 222 and the MDM server 106 waits for a new presence status. If a new presence status has been received, the method 200 returns to FIG. 2A and, particularly, to operation 208, wherein the MDM server 106 determines if a MDM session should be initiated. If the MDM server 106 determines that a MDM session should not be initiated, the method 200 loops back to the operations described in FIG. 2C. If the MDM server 106 determines that a MDM session should be initiated, the method 200 proceeds to operation 210 and the subsequent operations, as described above.

In some embodiments, the MDM server 106 is configured to utilize a timeout so that it does not wait for a presence update indefinitely or for a period of time that is deemed too long by, for example, the operator of the MDM server 106.

The method 200 assumes that a FOTA package is available for the mobile device 102. In some embodiments, the MDM server 106 instructs the presence server 108 to suspend sending presence updates to the MDM server 106 when a FOTA package is not available and instructs the presence server 108 to resume sending presence updates to the MDM server 106 when a new FOTA package is available.

Figure 3A:
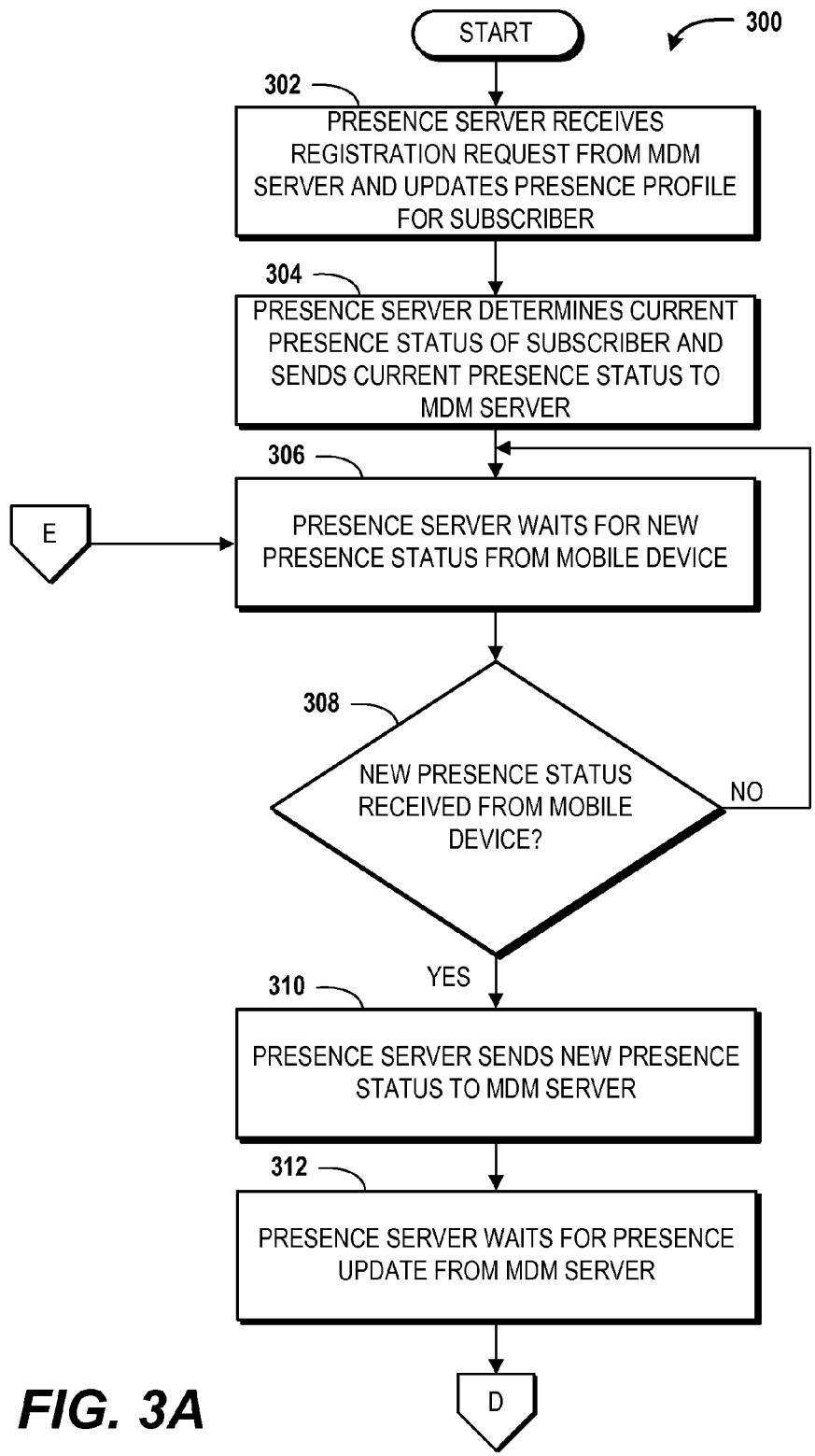
FIGS. 3A-3B are flow diagrams illustrating aspects of a method for performing a FOTA update procedure utilizing presence information from the perspective of a presence server, according to an exemplary embodiment.
Figure 3B:
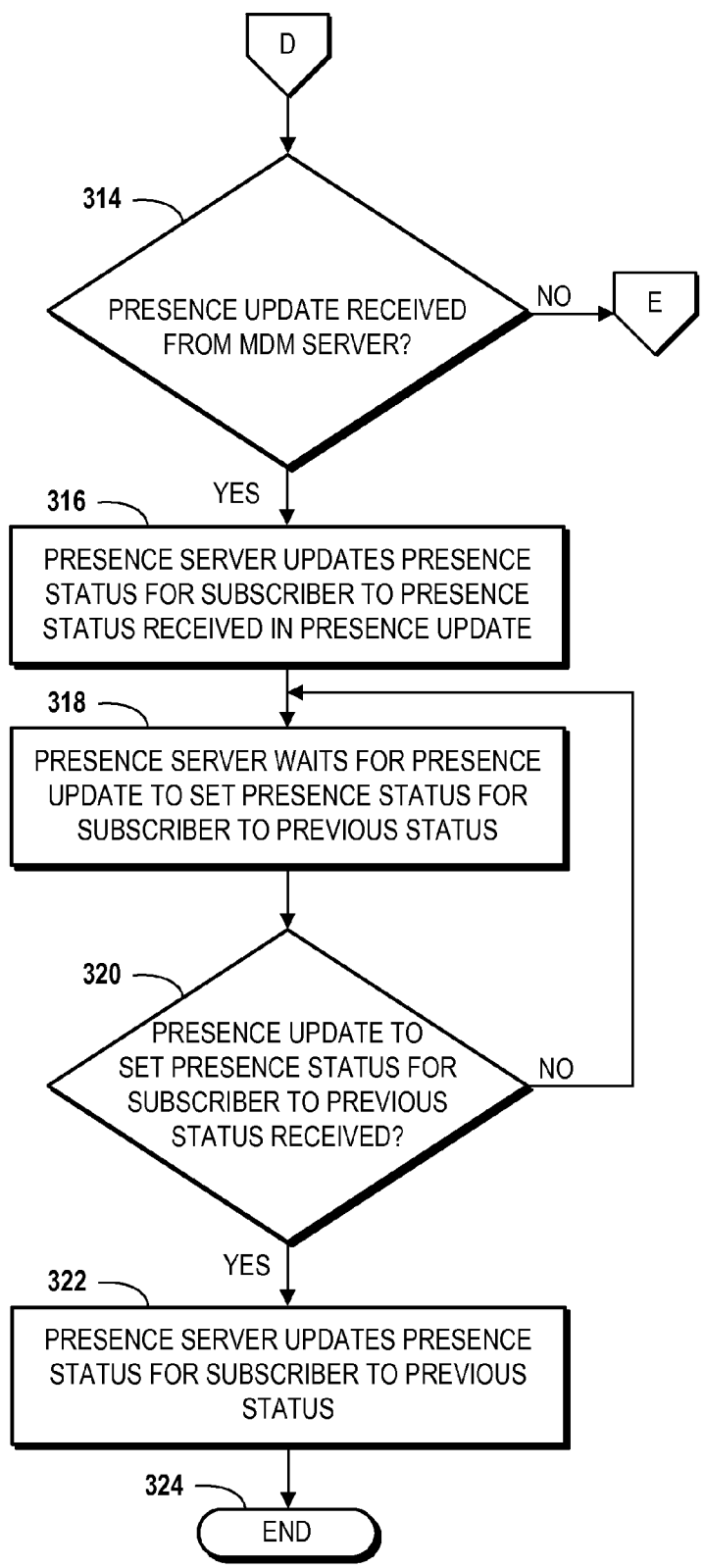

Turning now to FIGS. 3A-3B, flow diagrams illustrating a method 300 for performing a FOTA update procedure utilizing presence information will be described from the perspective of the presence server 108, according to an exemplary embodiment. Turning now to FIG. 3A, the method 300 begins and proceeds to operation 302, wherein the presence server 108 receives a registration request from the MDM server 106. As described above, the registration request includes a subscriber identifier. The presence server 108 locates a presence profile for the subscriber based upon the subscriber identifier and updates the presence profile to enable the presence-based FOTA update service for the subscriber. It is assumed that a presence profile has already been created for the subscriber. In some embodiments, a presence profile is created at this time.

From operation 302, the method 300 proceeds to operation 304, wherein the presence server 108 determines a current presence status of the subscriber and sends the current presence status to the MDM server 106. From operation 304, the method 300 proceeds to operation 306, wherein the presence server 108 waits for a new presence status from the mobile device 102. The presence server 108 determines, at operation 308, if a new presence status has been received from the mobile device 102. If the presence server 108 determines that a new presence status has not been received from the mobile device 102, the method 200 loops back to operation 306, wherein the presence server 108 reverts to waiting for a new presence status from the mobile device 102. If the presence server 108 determines that a new presence status has been received from the mobile device 102, the method 200 proceeds to operation 310, wherein the presence server 108 sends the new presence status to the MDM server 106.

From operation 310, the method 300 proceeds to operation 312, wherein the presence server 108 waits for a presence update from the MDM server 312. From operation 312, the method 300 proceeds to FIG. 3B and, particularly, to operation 314, wherein the presence server 108 determines if a presence update has been received from the MDM server 106. If the presence server 108 determines that a presence update has not been received from the MDM server 106, the method 300 proceeds to FIG. 3A and, particularly, to operation 306, wherein the presence server 108 waits for a new presence status from the mobile device 102. If the presence server 108 determines that a presence update has been received, the method 300 proceeds to operation 316, wherein the presence server 106 updates the presence status for the subscriber in the subscriber's profile in accordance with the presence status included in the presence update.

From operation 316, the method 300 proceeds to operation 318, wherein the presence server 108 waits for a presence update to set the presence status for the subscriber to a previous presence status before the presence update was received in operation 316. In other words, the presence server 108 waits for instructions from the MDM server 106 to revert the presence status to the previous presence status. For ease of explanation, this presence update is referred to herein as a reversion presence update. From operation 318, the method 300 proceeds to operation 320, wherein the presence server 108 determines if the reversion presence update has been received. If the presence server 108 determines that the reversion presence update has not been received, the method 300 loops back to operation 318. If the presence server 108 determines that the reversion presence update has been received, the method 300 proceeds to operation 322, wherein the presence server 108 updates the presence status for the subscriber in the subscriber's profile to the previous presence status. The method 300 then proceeds to operation 324. The method 300 ends at operation 324.

Figure 4A:
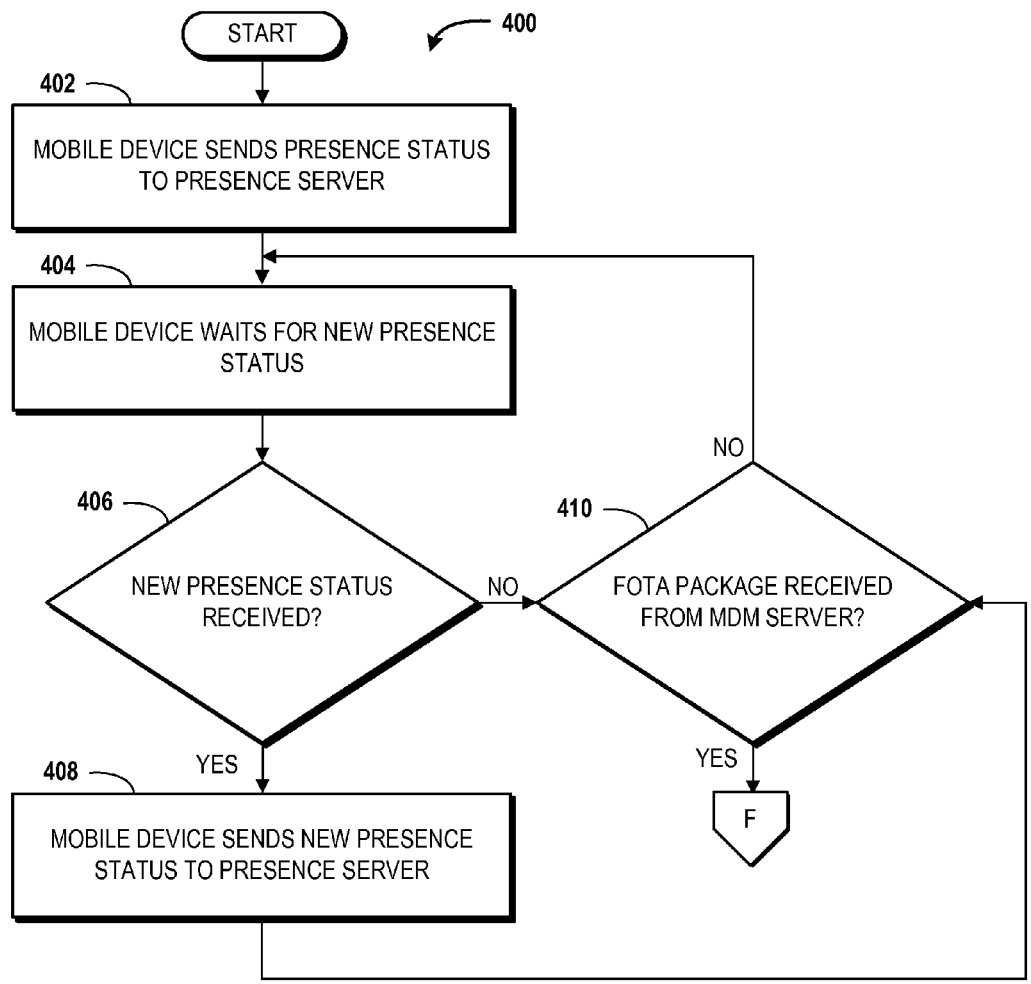
FIGS. 4A-4B are flow diagrams illustrating aspects of a method for performing a FOTA update procedure utilizing presence information from the perspective of a mobile device, according to an exemplary embodiment.
Figure 4B:
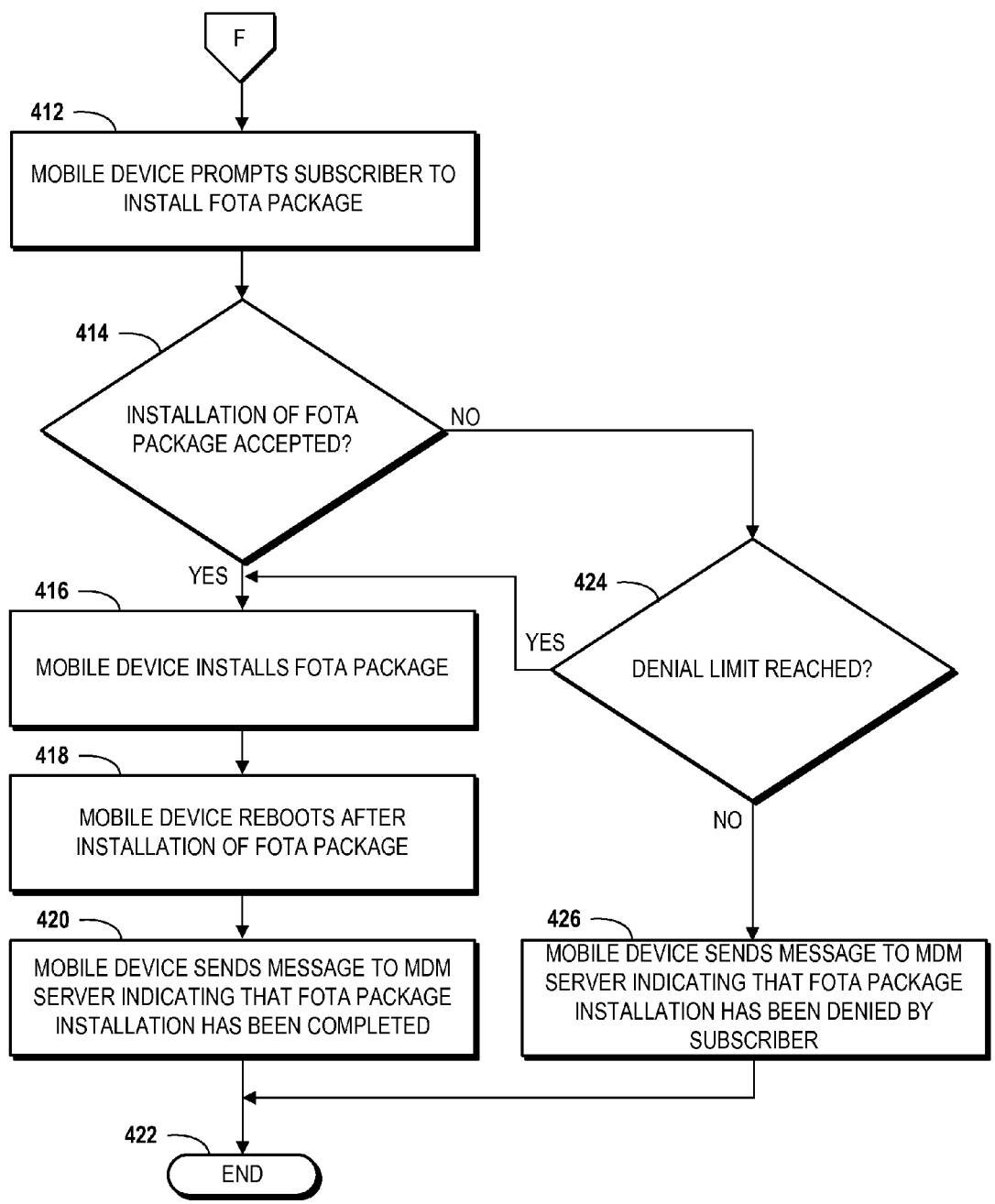

Turning now to FIGS. 4A and 4B, flow diagrams illustrating a method 400 for performing a FOTA update procedure utilizing presence information will be described from the perspective of the mobile device 102, according to an exemplary embodiment. Turning now to FIG. 4A, the method 400 begins and proceeds to operation 402, wherein the mobile device 102 sends a presence status to the presence server 108. From operation 402, the method 400 proceeds to operation 404, wherein the mobile device 102 waits for a new presence status. From operation 404, the method 400 proceeds to operation 406, wherein the mobile device 102 determines if a new presence status has been received. If the mobile device 102 determines that a new presence status has been received, the method 400 proceeds to operation 408, wherein the mobile device 102 sends the new presence status to the presence server 108.

From operation 408, the method 400 proceeds to operation 410, wherein the mobile device 102 determines if a FOTA package has been received from the MDM server 106. If the mobile device 102 determines that a FOTA package has not been received, the method 400 loops back to operation 404. If the mobile device 102 determines that a FOTA package has been received, the method 400 proceeds to FIG. 4B.

Turning now to FIG. 4B and, particularly, operation 412, the mobile device 102 prompts the subscriber to install the FOTA package. From operation 412, the method 400 proceeds to operation 414, wherein the mobile device 102 determines if installation of the FOTA package has been accepted. If installation of the FOTA package has been accepted, the method 400 proceeds to operation 416, wherein the mobile device 102 installs the FOTA package. From operation 416, the method 400 proceeds to operation 418, wherein the mobile device 102 reboots after installation of the FOTA package. It should be understood that the reboot at operation 416 may be required, may be optional, or may not occur at all. It also should be understood that the mobile device 102 may reboot one or more times during installation of the FOTA package. Moreover, a notification may be presented on a display or presented via a speaker of the mobile device 102 to inform the subscriber of a reboot operation.

From operation 418, the method 400 proceeds to operation 420, wherein the mobile device 102 generates a message to inform the MDM server 106 that the FOTA package installation has been completed and sends the message to the MDM server 106. From operation 420, the method 400 proceeds to operation 422. The method 400 ends at operation 422.

If the mobile device 102 determines, at operation 414, that installation of the FOTA package was denied, the method 400 proceeds to operation 424, wherein it is determined if a denial limit has been reached. In some embodiments, the denial limit is included in the FOTA package. If the denial limit has been reached, the method 400 proceeds to operation 416, wherein the mobile device 102 installs the FOTA package. If the denial limit has not been reached, the method 400 proceeds to operation 426, wherein the mobile device 102 generates a message to inform the MDM server 106 that the FOTA package installation has been denied by the subscriber and sends the message to the MDM server 106. The method 400 then proceeds to operation 422, wherein the method 400 ends.

Alternatively, the determination at operation 424 is performed by the MDM server 106. For example, the mobile device 102 may send a message to the MDM server 106 indicating that installation of the FOTA package has been denied, the MDM server 106 determines if the denial limit has been reached, and the MDM server 106 instructs the mobile device 102 how to proceed based upon this determination. In some embodiments, operation 414 is eliminated and the mobile device 102 installs the FOTA package without provided a prompt to the subscriber.

Figure 5:
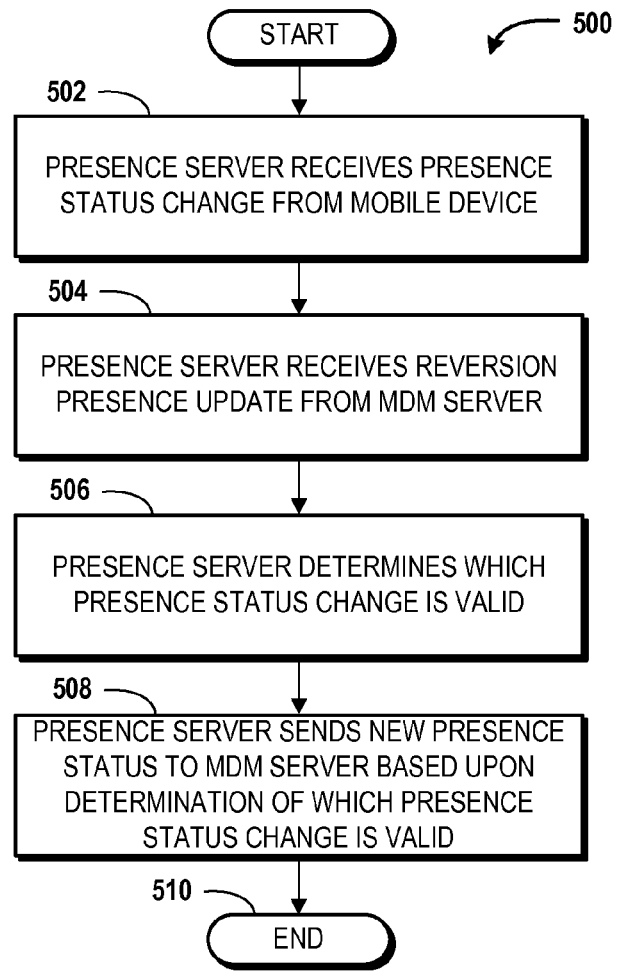
FIG. 5 is a flow diagram illustrating aspects of a method for presence status reconciliation for a FOTA update procedure, according to an exemplary embodiment.

Turning now to FIG. 5, a flow diagram illustrating aspects of a method 500 for presence status reconciliation during a FOTA update procedure will be described, according to an exemplary embodiment. The method 500 is utilized to reconcile the conflicting presence statuses received by the presence server 108 from the mobile device 102 and from the MDM server 106. As described above with reference to FIGS. 3A-3B, the presence server 108, at operation 316, updates the presence status for the subscriber in accordance with a presence status set by the MDM server 106. The presence server 108 reverts to the previous status at operation 322. If the presence server 108 receives a new presence status from the mobile device 102 and the reversion presence update from the MDM server 106, the presence server 108 can determine which presence status should govern.

The method 500 begins and proceeds to operation 502, wherein the presence server 108 receives a presence status change from the mobile device 102. From operation 502, the method 500 proceeds to operation 504, wherein the presence server 108 receives the presence reversion update from the MDM server 102. Although the method 500 illustrates the presence server 108 receiving the presence status change from the mobile device 102 before receiving the presence reversion update from the MDM server 106, the presence server 108 alternatively may first receive the presence reversion update from the MDM server 106, or may receive the presence reversion update from the MDM server 106 and the new presence status from the mobile device 102 simultaneously.

From operation 504, the method 500 proceeds to operation 506, wherein the presence server 106 determines which presence status change is valid. This may be based upon which status was received first or based upon a set rule, such as the presence server 106 uses the presence status provided by the mobile device 102 or the presence status provided by the MDM server 102. Based upon the determination at operation 506, the presence server 108 may optionally send the new presence status to the MDM server at operation 508. The method 500 then proceeds to operation 510. The method 500 ends at operation 510.

Figure 6:
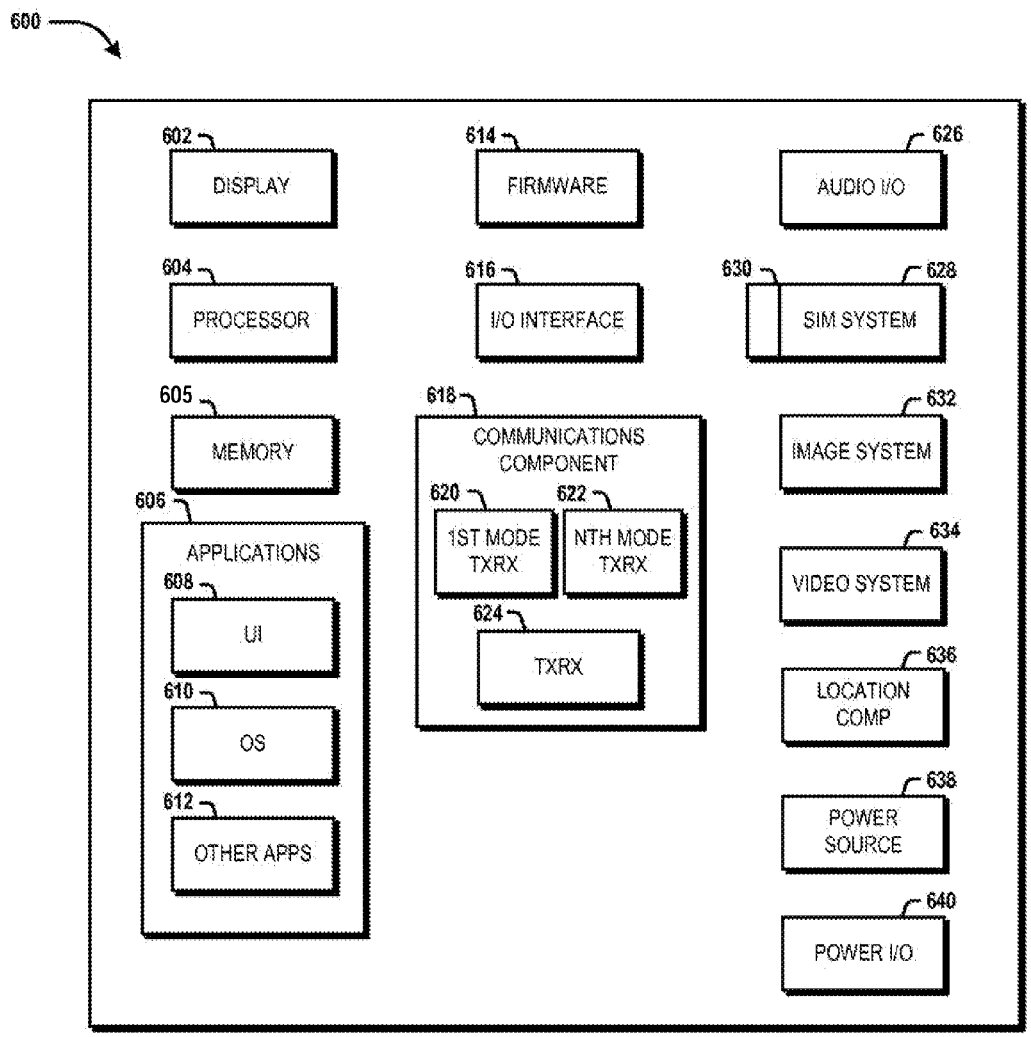
FIG. 6 is a mobile device architecture diagram illustrating an exemplary mobile device hardware and software architecture for a mobile device capable of implementing aspects of the embodiments disclosed herein.

Turning now to FIG. 6, an exemplary mobile device 600 and components thereof will be described. Although connections are not shown between the components illustrated in FIG. 6, the components can interact with each other to carry out device functions. In some embodiments, for example, the components are arranged so as to communicate via one or more busses (not shown). It should be understood that FIG. 6 and the following description are intended to provide a general understanding of a suitable environment in which various aspects of embodiments can be implemented. The mobile device 102 described herein above may be configured like the mobile device 600. It should be understood that the mobile device 102 may include additional functionality or include less functionality than now described.

As illustrated in FIG. 6, the mobile device 600 includes a display 602 for displaying data including, but not limited to, graphical user interface ("GUI") elements, text, images, video, virtual keypads and/or keyboards, messaging data, notification messages, metadata, internet content, device status, time, date, calendar data, device preferences, map and location data, and the like. The mobile device 600 also includes a processor 604 for processing data and/or executing computer-executable instructions of one or more applications 606 stored in a memory 605. In some embodiments, the applications 606 include a UI application 608. The UI application 608 interfaces with an operating system ("OS") application 610 to facilitate user interaction with device functionality and data. In some embodiments, the OS application 610 is one of SYMBIAN OS from SYMBIAN LIMITED, WINDOWS MOBILE OS from MICROSOFT CORPORATION, WINDOWS PHONE OS from MICROSOFT CORPORATION, PALM WEBOS from HEWLETT PACKARD CORPORATION, BLACKBERRY OS from RESEARCH IN MOTION LIMITED, IOS from APPLE INC., and ANDROID OS from GOOGLE INC. These operating systems are merely exemplary of the operating systems that may be used in accordance with the embodiments disclosed herein.

The UI application 608 aids a user in activating service over-the-air, if applicable, accepting, denying, or postponing FOTA updates received from the MDM server 106, entering message content, viewing received messages, answering/initiating calls, entering/deleting data, entering and setting user IDs and passwords for device access, configuring settings, manipulating address book content and/or settings, multi-mode interaction, interacting with other applications 612, and otherwise facilitating user interaction with the OS application 610 and the other applications 612.

In some embodiments, the other applications 612 include, for example, presence applications, visual voicemail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 606 or portions thereof are stored in the memory 605 and/or in a firmware 614, and are executed by the processor 604. The firmware 614 may also store code for execution during device power up and power down operations. In some embodiments, the OS 610 or a portion thereof, such as a kernel, is stored in the firmware 614. The firmware may include the firmware 112 described above with reference to FIG. 1 and may be updated in accordance with the FOTA update procedures described herein that rely on presence to determine when a FOTA update procedure should be initiated.

The mobile device 600 also includes an input/output ("I/O") interface 616 for the input/output of data such as location information, presence status information, user IDs, passwords, and application initiation (start-up) requests. In some embodiments, the I/O interface 616 is a hardwire connection such as a universal serial bus ("USB"), mini-USB, micro-USB, audio jack, PS2, IEEE 1394, serial, parallel, Ethernet (RJ411) port, RJ11 port, proprietary port, combinations thereof, or the like. In some embodiments, the mobile device 600 is configured to synchronize with another device (e.g., a computer) to transfer content stored to/from the mobile device 600. In some embodiments, the mobile device 600 is configured to receive updates to one or more of the applications 606 via the I/O interface 616. In some embodiments, the I/O interface 616 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 616 may be used for communications between the mobile device 600 and a network device or local device instead of, or in addition to, a communications component 618.

The communications component 618 interfaces with the processor 604 to facilitate wireless communications with one or more networks such as the network 104 shown in FIG. 1. In some embodiments, other networks include networks that utilize non-cellular wireless technologies such as WI-FI or WIMAX. In some embodiments, the communications component 618 includes a multimode communications subsystem for facilitating communications via the cellular network and one or more other networks.

The communications component 618, in some embodiments, includes one or more transceivers each configured to communicate over the same or a different wireless technology standard. For example, the transceivers of the communications component 618 may be configured to communicate using GSM, CDMAONE, CDMA2000, LTE, and various other 2G, 2.5G, 3G, 4G, and greater generation technology standards. Moreover, the communications component 618 may facilitate communications over various channel access methods (which may or may not be used by the aforementioned standards) including, but not limited to, TDMA, FDMA, W-CDMA, OFDM, SDMA, and the like. In addition, the communications component 618 may facilitate data communications using GPRS, EDGE, the HSPA protocol family including HSDPA, EUL or otherwise termed HSUPA, HSPA+, and various other current and future wireless data access standards.

In the illustrated embodiment, the communications component 618 includes a first cellular transceiver 620 that operates in one mode (e.g., GSM), and an $N^{th}$ cellular transceiver 622 operates in a different mode (e.g., UMTS). While only two cellular transceivers 620, 622 are illustrated, it should be appreciated that more than two transceivers can be included in the communications component 618.

The illustrated communications component 618 also includes an alternative communications transceiver 624 for use by other communications technologies including WI-FI, WIMAX, BLUETOOTH, infrared, infrared data association ("IRDA"), near field communications ("NFC"), other RF, combinations thereof, and the like. In some embodiments, the communications component 618 also facilitates reception from terrestrial radio networks, digital satellite radio networks, internet-based radio service networks, combinations thereof, and the like.

The communications component 618 processes data from a network such as an internet, an intranet, a home broadband network, a WI-FI hotspot, and the like, via an internet service provider ("ISP"), digital subscriber line ("DSL") provider, or broadband provider.

Audio capabilities for the mobile device 600 may be provided by an audio I/O component 626 that includes a speaker for the output of audio signals and a microphone to collect audio signals.

The illustrated mobile device 600 also includes a USIM system 628 that includes a SIM slot interface 630 for accommodating a USIM card. In some embodiments, the USIM system 628 is configured to accept insertion of other SIM cards for access to other network types such as GSM. In other embodiments, the USIM system 628 is configured to accept multiple SIM cards. In still other embodiments, the USIM system 628 is configured to accept a universal integrated circuit card ("UICC") with one or more SIM applications stored thereupon.

The mobile device 600 may also include an image capture and processing system 632 ("image system"). Photos may be obtained via an associated image capture subsystem of the image system 632, for example, a camera. The mobile device 600 may also include a video system 634 for capturing, processing, recording, and/or modifying video content. Photos and videos obtained using the image system 632 and the video system 634, respectively, may be added as message content to a multimedia message service ("MMS") message and sent to another mobile device.

The illustrated mobile device 600 also includes a location component 636 for sending and/or receiving signals such as global positioning system ("GPS") data, assisted-GPS data, WI-FI/WIMAX and/or cellular network triangulation data, combinations thereof, and the like, for determining a location of the mobile device 600. The location component 636 may communicate with the communications component 618 to retrieve triangulation data for determining a location of the mobile device 600. In some embodiments, the location component 636 interfaces with cellular network nodes, telephone lines, satellites, location transmitters and/or beacons, wireless network transmitters and receivers, combinations thereof, and the like. In some embodiments, the location component 636 includes one or more sensors such as a compass, an accelerometer, and/or a gyroscope to determine the orientation of the mobile device 600. Using the location component 636, the mobile device 600 can generate and/or receive data to identify its location, or transmit data used by other devices to determine the location of the mobile device 600. The location component 636 may include multiple components for determining the location and/or orientation of the mobile device 600.

The illustrated mobile device 600 also includes a power source 638, such as one or more batteries and/or other power subsystem (AC or DC). The power source 638 may interface with an external power system or charging equipment via a power I/O component 640.

As used herein, communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 600 or other devices or computers described herein. For purposes of the claims, the phrase "computer storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the mobile device 600 in order to store and execute the software components presented herein. It is also contemplated that the mobile device 600 may not include all of the components shown in FIG. 6, may include other components that are not explicitly shown in FIG. 6, or may utilize an architecture completely different than that shown in FIG. 6.

Figure 7:
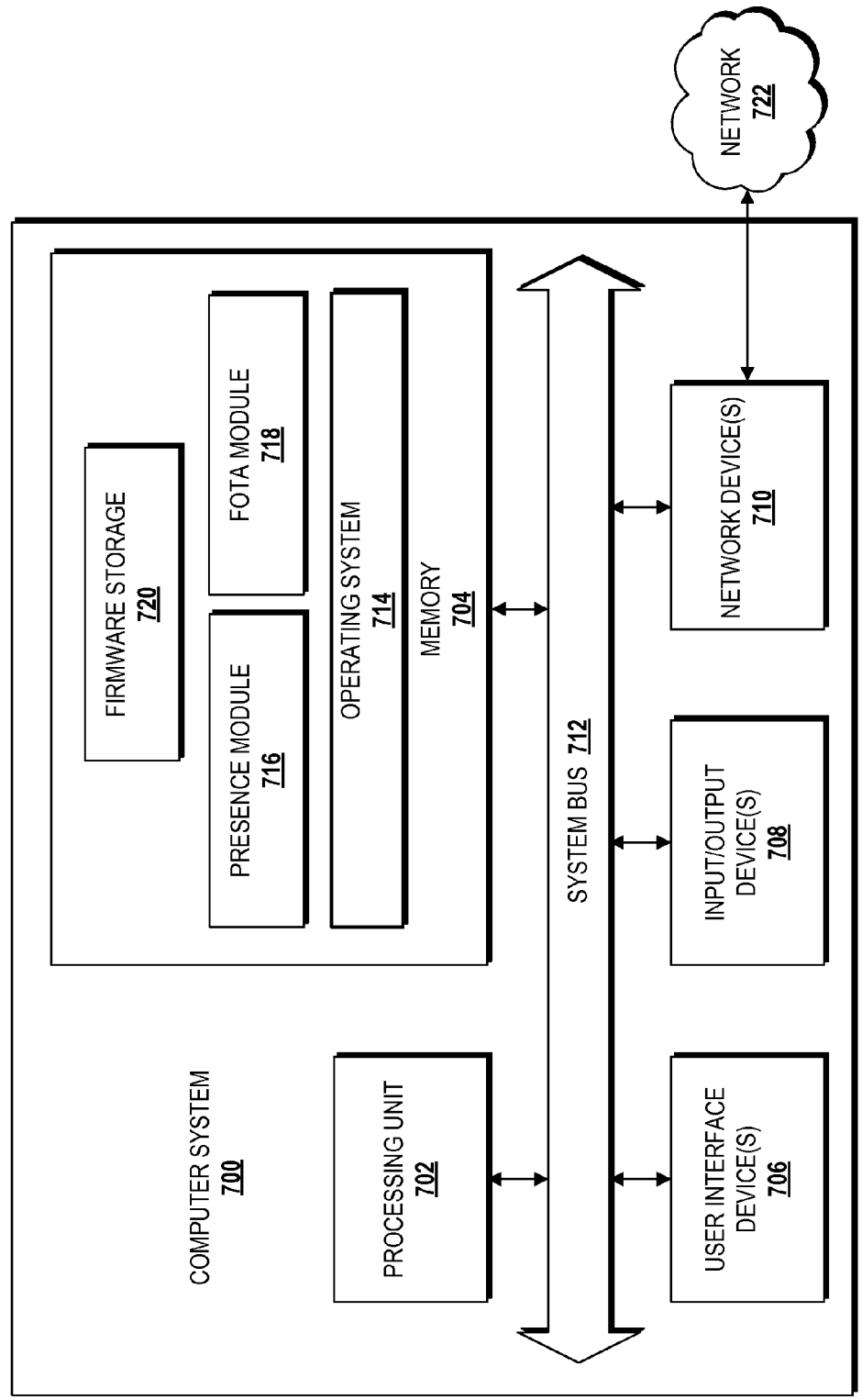
FIG. 7 is a computer architecture diagram illustrating an exemplary computer hardware and software architecture for a computing system capable of implementing aspects of the embodiments presented herein.

FIG. 7 is a block diagram illustrating a computer system 700 configured to perform various operations disclosed herein. The computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the computer system 700. Processing units are generally known, and therefore are not described in further detail herein.

The memory 704 communicates with the processing unit 702 via the system bus 712. In some embodiments, the memory 704 is operatively connected to a memory controller (not shown) that enables communication with the processing unit 702 via the system bus 712. The illustrated memory 704 includes an operating system 714 and one or more program modules, including a presence module 716 and a FOTA module 718. The illustrated memory 704 also includes a firmware storage 720 configured to store one or more firmware updates for distribution to one or more mobile devices, such as the mobile device 102 or the mobile device 600, in accordance with the FOTA update procedures disclosed herein. It should be understood that although the presence module 716, the FOTA module 718 and the firmware storage 720 are illustrated as being including in the memory 704, in implementation, these modules would be included in the appropriate computer or device. For example, the presence module 716 would be included in the presence server 108, the FOTA module 718 would be included in the MDM server 106, and the firmware storage 720 would be included in the firmware provider server 110 to perform the respective operations described herein above.

The operating system 714 can include, but is not limited to, members of the WINDOWS, WINDOWS CE, WINDOWS MOBILE, and/or WINDOWS PHONE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS and/or iOS families of operating systems from APPLE INC., the FREEBSD family of operating systems, the SOLARIS family of operating systems from ORACLE CORPORATION, other operating systems such as proprietary operating systems, and the like.

The user interface devices 706 may include one or more devices with which a user accesses the computer system 700. The user interface devices 706 may include, but are not limited to, computers, servers, personal digital assistants, telephones (e.g., cellular, IP, or landline), or any suitable computing devices. The I/O devices 708 enable a user to interface with the program modules. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the computer system 700 to communicate with other networks or remote systems via a network 722, such as the network 104 described above with reference to FIG. 1 or some other network. Examples of the network devices 710 include, but are not limited to, a modem, a radio frequency ("RF") or infrared ("IR") transceiver, a telephonic interface, a bridge, a router, or a network card. The network 722 may include a wireless network such as, but not limited to, a WLAN such as a WI-FI network, a WWAN, a wireless personal area network ("WPAN") such as BLUETOOTH, or a wireless metropolitan area network ("WMAN"). Alternatively, the network 722 may be a wired network such as, but not limited to, a wide area network ("WAN") such as the Internet, a local area network ("LAN") such as the Ethernet, a wired personal area network ("PAN"), or a wired metropolitan area network ("MAN").

The network 722 embodied as a cellular network may utilize a mobile telecommunications technology such as, but not limited to, GSM, UMTS, CDMA ONE, CDMA2000, LTE, and various other 2G, 2.5G, 3G, 4G, and greater generation mobile telecommunications technologies. In addition, mobile data communications technologies such as GPRS, EDGE, the HSPA protocol family including HSDPA, EUL or otherwise termed HSUPA, HSPA+, and various other current and future mobile data communications technologies are contemplated for use by the network 722. Therefore, the embodiments presented herein should not be construed as being limited to a particular mobile telecommunications technology and/or standards utilizing such technologies.

Based on the foregoing, it should be appreciated that technologies for coordinating FOTA updates for mobile devices utilizing presence information have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A method comprising:
   receiving, at a mobile device management server computer, a presence status associated with a subscriber;
   in response to receiving the presence status, determining, at the mobile device management server computer based upon the presence status, whether to initiate a mobile device management session during which to deliver a firmware over-the-air update to a mobile device associated with the subscriber;
   if the mobile device management server computer determines based upon the presence status that a mobile device management session is to be initiated,
      initiating, at the mobile device management server computer, a mobile device management session,
      delivering the firmware over-the-air update to the mobile device over the mobile device management session,
      after delivering the firmware over-the-air update to the mobile device, receiving, at the mobile device management server computer, a message from the mobile device indicating an acceptance and installation of the firmware over-the-air update,
      in response to receiving the message from the mobile device indicating the acceptance and installation of the firmware over-the-air update,
         generating, at the mobile device management server computer, a presence update comprising instructions directed to a presence server computer to change the presence status to a new presence status that indicates the subscriber is unavailable, and
         sending, at the mobile device management server computer, the presence update to the presence server computer; and
   if the mobile device management server computer determines based upon the presence status that a mobile device management session is not to be initiated, postponing delivery of the firmware over-the-air update to the mobile device until a new presence status is received at the mobile device management server computer that indicates the mobile device is available to receive the firmware over-the-air update.

2. The method of claim 1, further comprising:
   receiving, at the mobile device management server computer, a request to register the subscriber for a presence-based firmware over-the-air update service;
   generating, at the mobile device management server computer, a registration request in response to receiving the request to register the subscriber for the presence-based firmware over-the-air update service; and
   sending, at the mobile device management server computer, the registration request to the presence server computer.

3. The method of claim 2, wherein the registration request comprises a subscriber identifier.

4. The method of claim 1, further comprising:
   receiving, at the mobile device management server computer, an update message from the mobile device, the update message indicating that the firmware over-the-air update was installed on the mobile device; and
   generating, at the mobile device management server computer, a reversion presence update, the reversion presence update comprising instructions directed to the presence server computer to revert the new presence status to the presence status.

5. The method of claim 1, wherein determining, at the mobile device management server computer based upon the presence status, whether to initiate the mobile device management session during which to deliver the firmware over-the-air update to the mobile device associated with the subscriber comprises determining if the presence status is an idle presence status;
if the mobile device management server computer determines that the presence status is an idle presence status, initiating, at the mobile device management server computer, the mobile device management session, and delivering the firmware over-the-air update to the mobile device over the mobile device management session; and
if the mobile device management server computer determines that the presence status is not an idle presence status, postponing delivery of the firmware over-the-air update to the mobile device until the new presence status is received at the mobile device management server computer that indicates the mobile device is available to receive the firmware over-the-air update.

6. A computer-readable storage medium comprising computer-executable instructions that, when executed by a mobile device management server computer, cause the mobile device management server computer to perform operations comprising:
receiving a presence status associated with a subscriber;
in response to receiving the presence status, determining based upon the presence status whether to initiate a mobile device management session during which to deliver a firmware over-the-air update to a mobile device associated with the subscriber;
if it is determined based upon the presence status that a mobile device management session is to be initiated,
initiating a mobile device management session,
delivering the firmware over-the-air update to the mobile device over the mobile device management session,
after delivering the firmware over-the-air update to the mobile device, receiving a message from the mobile device indicating an acceptance and installation of the firmware over-the-air update,
in response to receiving the message from the mobile device indicating the acceptance and installation of the firmware over-the-air update,
generating a presence update comprising instructions directed to a presence server computer to change the presence status to a new presence status that indicates the subscriber is unavailable, and
sending the presence update to the presence server computer; and
if it is determined based upon the presence status that a mobile device management session is not to be initiated, postponing delivery of the firmware over-the-air update to the mobile device until a new presence status is received at the mobile device management server computer that indicates the mobile device is available to receive the firmware over-the-air update.

7. The computer-readable storage medium of claim 6, wherein the operations further comprise:
receiving a request to register the subscriber for a presence-based firmware over-the-air update service;
generating a registration request in response to receiving the request to register the subscriber for the presence-based firmware over-the-air update service; and
sending the registration request to the presence server computer.

8. The computer-readable storage medium of claim 7, wherein the registration request comprises a subscriber identifier.

9. The computer-readable storage medium of claim 6, wherein the operations further comprise:
receiving an update message from the mobile device, the update message indicating that the firmware over-the-air update was installed on the mobile device; and
generating a reversion presence update, the reversion presence update comprising instructions directed to the presence server computer to revert the new presence status to the presence status.

10. The computer-readable storage medium of claim 6, wherein determining based upon the presence status whether to initiate the mobile device management session during which to deliver the firmware over-the-air update to the mobile device associated with the subscriber comprises determining if the presence status is an idle presence status;
if it is determined that the presence status is an idle presence status,
initiating the mobile device management session, and
delivering the firmware over-the-air update to the mobile device over the mobile device management session; and
if it is determined that the presence status is not an idle presence status, postponing delivery of the firmware over-the-air update to the mobile device until the new presence status is received at the mobile device management server computer that indicates the mobile device is available to receive the firmware over-the-air update.

11. A mobile device management server computer comprising:
a processor; and
a memory comprising computer-executable instructions that, when executed by the processor, cause the processor to perform operations comprising
receiving a presence status associated with a subscriber,
in response to receiving the presence status, determining based upon the presence status whether to initiate a mobile device management session during which to deliver a firmware over-the-air update to a mobile device associated with the subscriber,
if it is determined based upon the presence status that a mobile device management session is to be initiated,
initiating a mobile device management session,
delivering the firmware over-the-air update to the mobile device over the mobile device management session,
after delivering the firmware over-the-air update to the mobile device, receiving a message from the mobile device indicating an acceptance and installation of the firmware over-the-air update,
in response to receiving the message from the mobile device indicating the acceptance and installation of the firmware over-the-air update,
generating a presence update comprising instructions directed to a presence server computer to change the presence status to a new presence status that indicates the subscriber is unavailable, and
sending the presence update to the presence server computer, and
if it is determined based upon the presence status that a mobile device management session is not to be initiated, postponing delivery of the firmware over-the-air update to the mobile device until a new presence status is received at the mobile device management server computer that indicates the mobile device is available to receive the firmware over-the-air update.

12. The mobile device management server computer of claim 11, wherein the operations further comprise:

receiving an update message from the mobile device, the update message indicating that the firmware over-the-air update was installed on the mobile device; and generating a reversion presence update, the reversion presence update comprising instructions directed to the presence server computer to revert the new presence status to the presence status.

13. The mobile device management server computer of claim 11, wherein determining based upon the presence status whether to initiate the mobile device management session during which to deliver the firmware over-the-air update to the mobile device associated with the subscriber comprises determining if the presence status is an idle presence status;

if it is determined that the presence status is an idle presence status, initiating the mobile device management session, and delivering the firmware over-the-air update to the mobile device over the mobile device management session; and if it is determined that the presence status is not an idle presence status, postponing delivery of the firmware over-the-air update to the mobile device until the new presence status is received at the mobile device management server computer that indicates the mobile device is available to receive the firmware over-the-air update.

14. The mobile device management server computer of claim 11, wherein the operations further comprise:

receiving a request to register the subscriber for a presence-based firmware over-the-air update service;

generating a registration request in response to receiving the request to register the subscriber for the presence-based firmware over-the-air update service, the registration request comprising a subscriber identifier; and sending the registration request to a presence server computer.

* * * * *